(12) United States Patent
Asai

(10) Patent No.: US 6,989,913 B2
(45) Date of Patent: Jan. 24, 2006

(54) HALFTONE DOTS, HALFTONE DOT FORMING METHOD AND APPARATUS THEREFOR

(75) Inventor: Hiroshi Asai, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 839 days.

(21) Appl. No.: 09/741,798

(22) Filed: Dec. 22, 2000

(65) Prior Publication Data

US 2002/0051147 A1    May 2, 2002

(30) Foreign Application Priority Data

Dec. 24, 1999 (JP) ................................ 11-366395

(51) Int. Cl.
*G06F 15/00* (2006.01)
(52) U.S. Cl. ............ 358/1.9; 358/3.06; 358/3.09; 358/3.13; 345/596
(58) Field of Classification Search .......... 358/3.02, 358/3.06, 3.09, 3.1, 3.11, 3.12, 3.13, 3.14, 358/3.16, 3.19, 298, 1.9, 500, 3.17; 395/109; 382/237; 345/89, 596

See application file for complete search history.

(56) References Cited

U.S. PATENT DOCUMENTS

| | | | |
|---|---|---|---|
| 5,067,025 A * | 11/1991 | Kitagawa | 358/3.2 |
| 5,264,926 A * | 11/1993 | Rylander | 358/500 |
| 5,579,457 A | 11/1996 | Hall | |
| 5,642,436 A * | 6/1997 | Kerz | 382/237 |
| 5,689,623 A | 11/1997 | Pinard | |
| 5,745,250 A * | 4/1998 | Hains | 358/3.17 |
| 5,784,049 A | 7/1998 | Hall | |
| 5,808,622 A | 9/1998 | Hall | |
| 5,828,463 A * | 10/1998 | Delabastita | 358/3.17 |
| 5,859,955 A | 1/1999 | Wang | |
| 5,987,219 A * | 11/1999 | Naylor et al. | 358/1.9 |
| 6,064,359 A * | 5/2000 | Lin et al. | 345/89 |
| 6,072,592 A * | 6/2000 | Ashworth | 358/1.9 |
| 6,088,512 A * | 7/2000 | Ancin et al. | 358/1.9 |
| 6,163,382 A * | 12/2000 | Netz et al. | 358/1.9 |
| 6,356,360 B1 * | 3/2002 | Rushing et al. | 358/1.9 |
| 6,724,499 B1 * | 4/2004 | Satoh | 358/1.9 |

FOREIGN PATENT DOCUMENTS

| | | |
|---|---|---|
| EP | 647058 A2 | 4/1995 |
| EP | 721278 A2 | 7/1996 |
| EP | 843462 A2 | 5/1998 |
| JP | 61-154364 | 7/1986 |
| JP | 11-17821 A | 7/1999 |

OTHER PUBLICATIONS

"Dot Pattern Processing Using Voronoi Neighborhoods", Narendra Ahuja, IEEE Tranasctions on Pattern Analysis and Machine Intelligence, vol. PAMI-4, No. 3, May, 1982, pp. 336-343.*

(Continued)

*Primary Examiner*—Kimberly Williams
*Assistant Examiner*—Beniyam Menberu
(74) *Attorney, Agent, or Firm*—McDermott Will & Emery LLP

(57) ABSTRACT

Each halftone dot is randomly placed, and the halftone dot area rate at which half of the halftone dots join with their adjacent halftone dots in an image area having a uniform image density is set to a value larger than 50%. When each halftone dot joins with its adjacent halftone dots, a plurality of joining points at which the halftone dot joins with-its adjacent halftone dots do not simultaneously start to join with the adjacent halftone dots.

3 Claims, 16 Drawing Sheets

HALFTONE DOT GROWTH PROCESS IN FIRST EMBODIMENT

Arrows indicate points of joining with adjacent halftone dots. A halftone dot does not start to join with all of the adjacent halftone dots at the same time.

OTHER PUBLICATIONS

"Using the Voronoi Tessellation for Grouping Words and Multi-part Symbols in Documents", Mark Burge and Gladys Monagan, Department of Computer Science, Swiss Federal Institute of Technology (ETH), Jul. 3, 1997, pp. 1-10.*

Ostromoukhov, et al., "Stochastic Clustered-Dot Dithering"Ecole Poly technique Federale, Lausanne (EPFL).

Ancin H, et al. "New Void-and-Cluster Method for Improved Halftone Uniformity" Journal of Electronic Imaging, SPIE + IS&T, US, vol. 8, No. 1, Jan. 1999, pp. 104-111, XP000801644 ISSN: 1017-9909.

Ostromoukhov V, et al. "Stochastic Clustered-Dot Dithering" Journal of Electronic Imaging, SPIE + IS&T, US, vol. 8, No. 4, Oct. 1999, pp. 439-445, XP000875036 ISSN: 1017-9909.

* cited by examiner

RANDOM HALFTONE DOT CENTER DISTRIBUTION
(VORONOI DIAGRAM)

⊙ : HALFTONE DOT CENTER

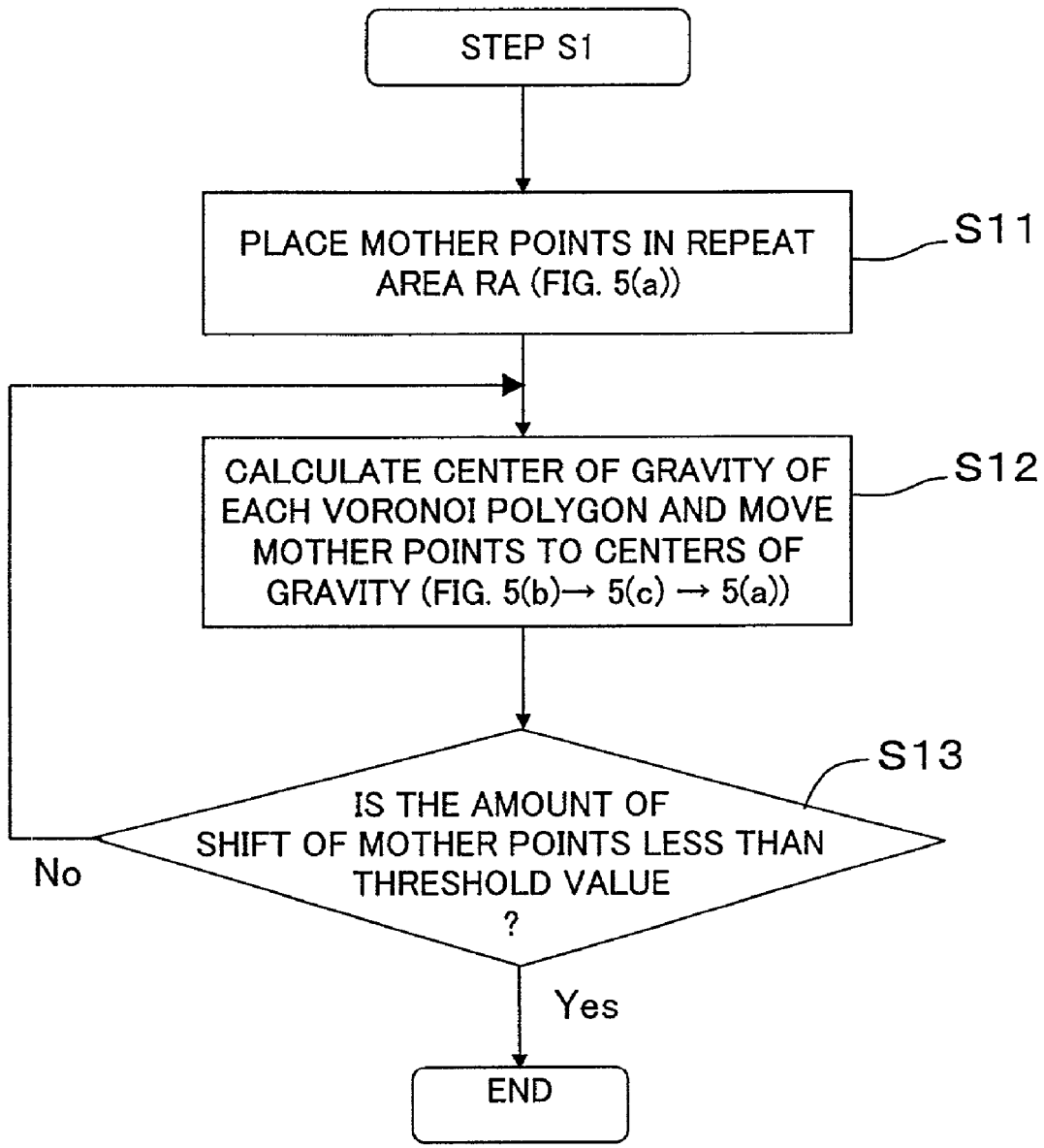

Fig. 5(a) MOTHER POINT ARRANGEMENT AT ONE POINT IN TIME

Fig. 5(b) VORONOI DIAGRAM FOR Fig. 5(a)

■ PRIOR MOTHER POSITION
▨ CENTER OF GRAVITY (NEW MOTHER POSITION)

ONE PIXEL

HALFTONE DOT CELL

SETTING OF HALFTONE DOT CELLS
(CLOSEST HALFTONE DOT CENTER
FOR EACH PIXEL IS CALCULATED)

HALFTONE DOT CENTERS OBTAINED
THROUGH CALCULATION

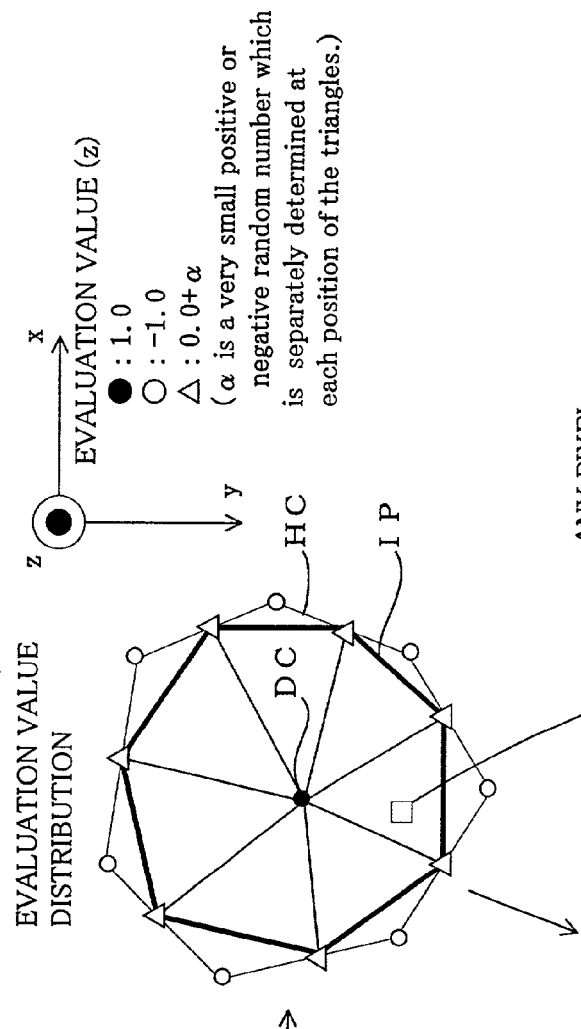
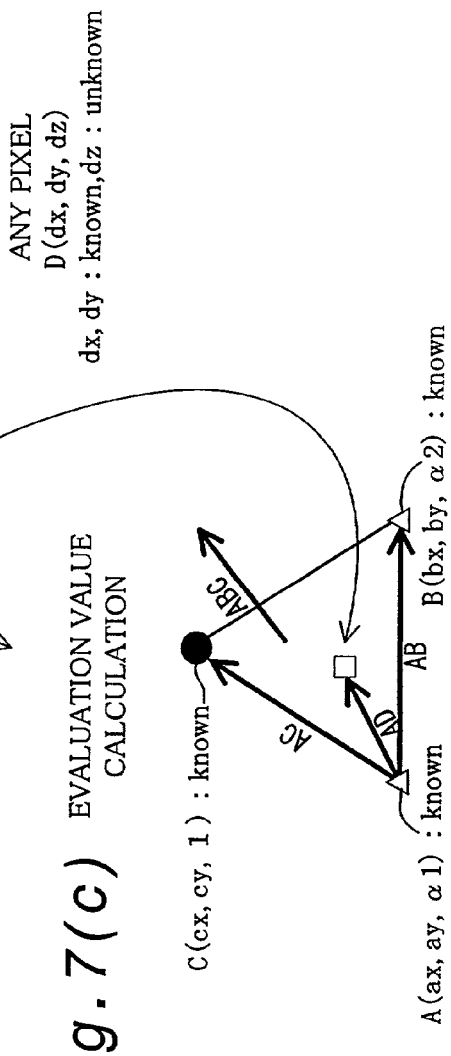
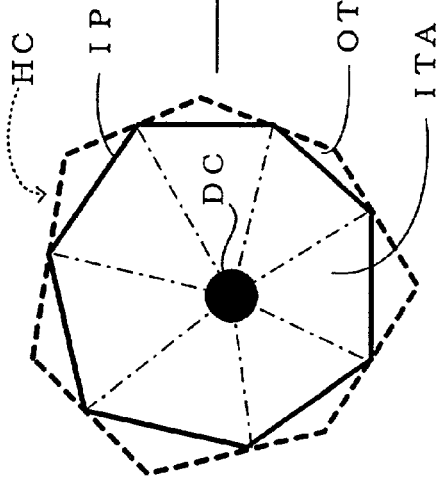

FINAL LIGHTING PRIORITIES FOR PIXELS HAVING
IDENTICAL FINAL EVALUATION VALUES
(Arrows indicate an order of priorities.)

UNDESIRABLE EXAMPLE

DESIRABLE EXAMPLE

HALFTONE DOT GROWTH PROCESS IN FIRST EMBODIMENT

Arrows indicate points of joining with adjacent halftone dots. A halftone dot does not start to join with all of the adjacent halftone dots at the same time.

DETERMINATION OF EVALUATION VALUE DISTRIBUTION IN SECOND EMBODIMENT
Fig.11(a)
DIVIDE HALFTONE DOT CELL INTO MULTIPLE TRIANGULAR AREAS
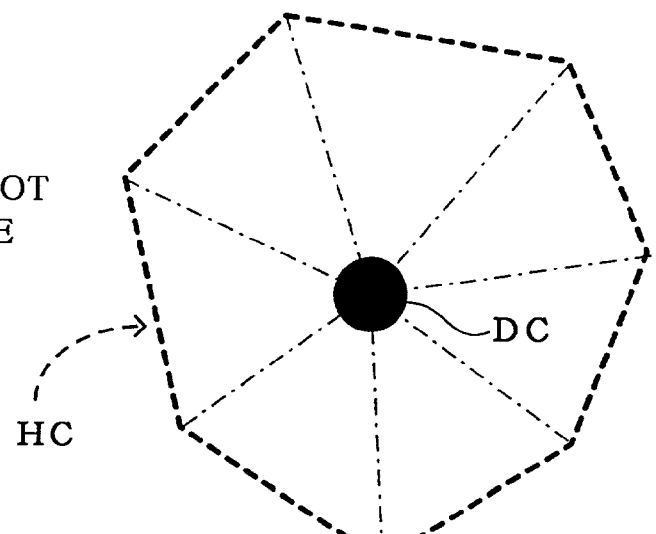
Fig.11(b)
EVALUATION VALUE DISTRIBUTION
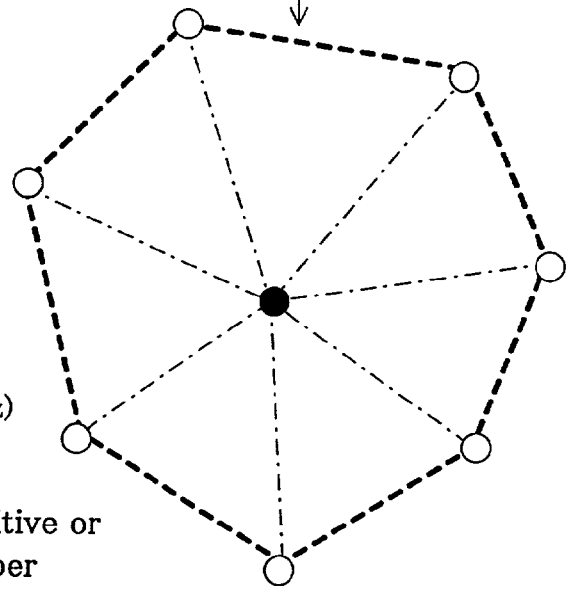
EVALUATION VALUE (z)
● : 1.0
○ : -1.0+ α
( α is a very small positive or negative random number which is separately determined at each position of the open circles.)

HALFTONE DOT GROWTH PROCESS IN SECOND EMBODIMENT

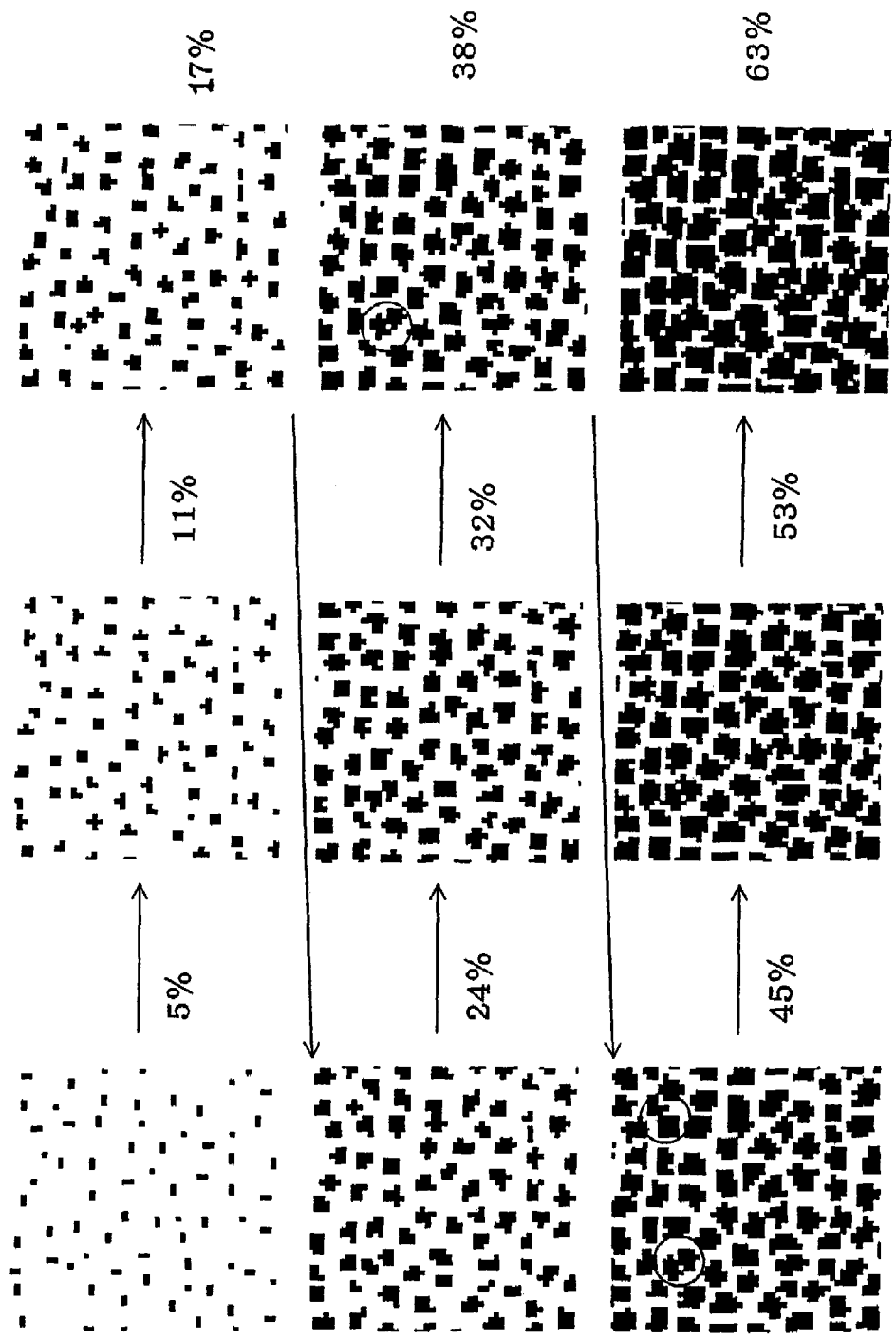
Fig. 13  HALFTONE DOT GROWTH PROCESS IN TINT IMAGE IN SECOND EMBODIMENT

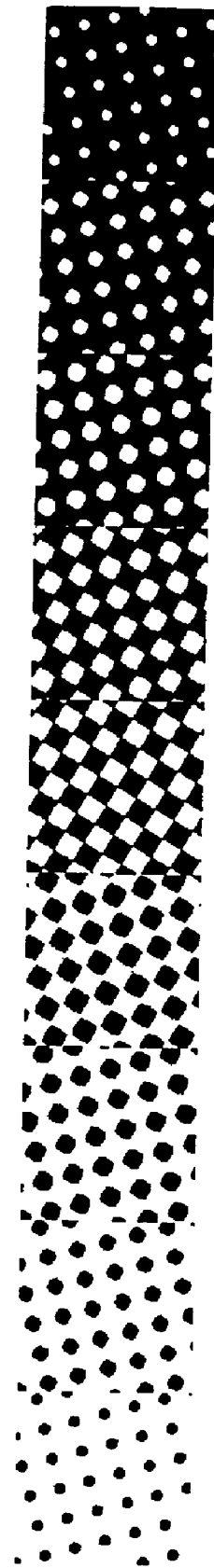
Fig. 14(a) AM HALFTONE DOTS (SQUARE DOTS)
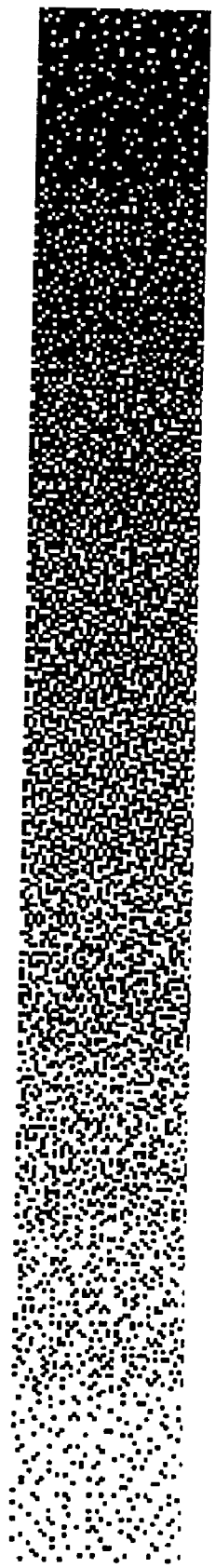
Fig. 14(b) FM DOTS

BI-TONE HALFTONE DOT

TRI-TONE HALFTONE DOT

WHITE AREA: DARKNESS = 0
BLACK AREA: DARKNESS = 1
HATCHED AREA: DARKNESS = 0.5

SMALLEST HALFTONE DOT
CONSISTING OF ONE PIXEL

SMALLEST HALFTONE DOT CONSISTING
OF MULTIPLE PIXELS

HALFTONE DOTS, HALFTONE DOT FORMING METHOD AND APPARATUS THEREFOR

BACKGROUND OF THE INVENTION

1. Field of the Invention

The present invention relates to a technology for forming halftone dots used in printing.

2. Description of the Related Art

In high grade printing process, an original multi-tone image is converted into halftone images for primary ink colors, and these halftone images are then used to produce a print image. Halftone dots are generally used in the halftoning process for converting the original image into halftone images.

Conventional halftone dots (so-called AM halftone dots) are regularly arranged at certain intervals in a matrix fashion. The image density is expressed in terms of the total area of the halftone dots per unit area. In other words, the regular arrangement of AM halftone dots is fixed at all times, and the number of black pixels that constitute one halftone dot increases as the level of the multi-tone image signal increases. In this description, 'pixel' refers to one unit of recording in an image recorder. For example, in an image recorder that exposes photosensitive film or a printing plate using laser beams, one light spot of a laser beam corresponds to one pixel.

The following problems have been identified with conventional regularly arranged AM halftone dots:

(1) Moiré is likely to occur in periodic images.

(2) Rosette moiré is likely to occur in color printing.

(3) Tone jump is likely to occur when the halftone dot area rate is 50% in the case of square halftone dots because all adjacent halftone dots join each other at the same time throughout the image.

Consequently, in recent years, a halftone method called FM screening has quite often been used. In FM screening, the image density is increased not by increasing the halftone dot size but by increasing the number of small dots, which are called FM dots. Using FM screening, the above-mentioned various problems occurring in connection with AM halftone dots are reduced.

However, FM screening also has the following problems:

(1) The reduction of dot size makes it difficult to obtain stable printing performance.

(2) The increase of the dot size, on the other hand, would cause the image to exhibit noticeable roughness.

(3) The dot size is likely to change during printing process (in other words, the dot gain characteristic is unstable) because a (circumference/area) ratio of one FM screening dot is larger than the conventional halftone dot.

SUMMARY OF THE INVENTION

An object of the present invention is to provide halftone dots having printing performance that is more desirable, in at least some terms, than the conventional halftone dots, as well as to provide a printing technology using these halftone dots.

According to the present invention, each halftone dot is randomly placed, and a halftone dot area rate at which half of the halftone dots join with their adjacent halftone dots in an image area having a uniform image density is set to a value larger than 50%. When each halftone dot joins with its adjacent halftone dots, a plurality of joining points at which the halftone dot joins with its adjacent halftone dots do not simultaneously start to join with the adjacent halftone dots. In this configuration, the occurrence of moiré and that of tone jump are both reduced, and the halftone dots will provide superior printing stability and a better halftone dot gain characteristic.

It is preferred that halftone dot cells each of which includes one halftone dot have various irregular shapes. Smooth images will be reproduced with these halftone dots.

The present invention may be implemented in various forms such as: halftone dots, a halftone dot forming method and apparatus, a printing method and apparatus, a computer program to implement these methods and apparatus functions, a computer program product of the computer program, and data signals embodied in a carrier wave including the computer program.

These and other objects, features, aspects, and advantages of the present invention will become more apparent from the following detailed description of the preferred embodiments with the accompanying drawings.

BRIEF DESCRIPTION OF THE DRAWINGS

FIG. 4 is a flow chart showing the detailed process of step S1;

FIGS. 7($a$)–7($c$) show the method of setting evaluation value distribution in a halftone dot cell in the first embodiment;

FIGS. 11($a$) and 11($b$) shows the method of setting the evaluation value distribution in the second embodiment;

FIG. 13 shows an example of a tint image recorded with the halftone dots pertaining to the second embodiment;

FIGS. 14($a$) and 14($b$) show examples of tint images recorded with conventional dots;

DESCRIPTION OF THE PREFERRED EMBODIMENT

Figure 1:
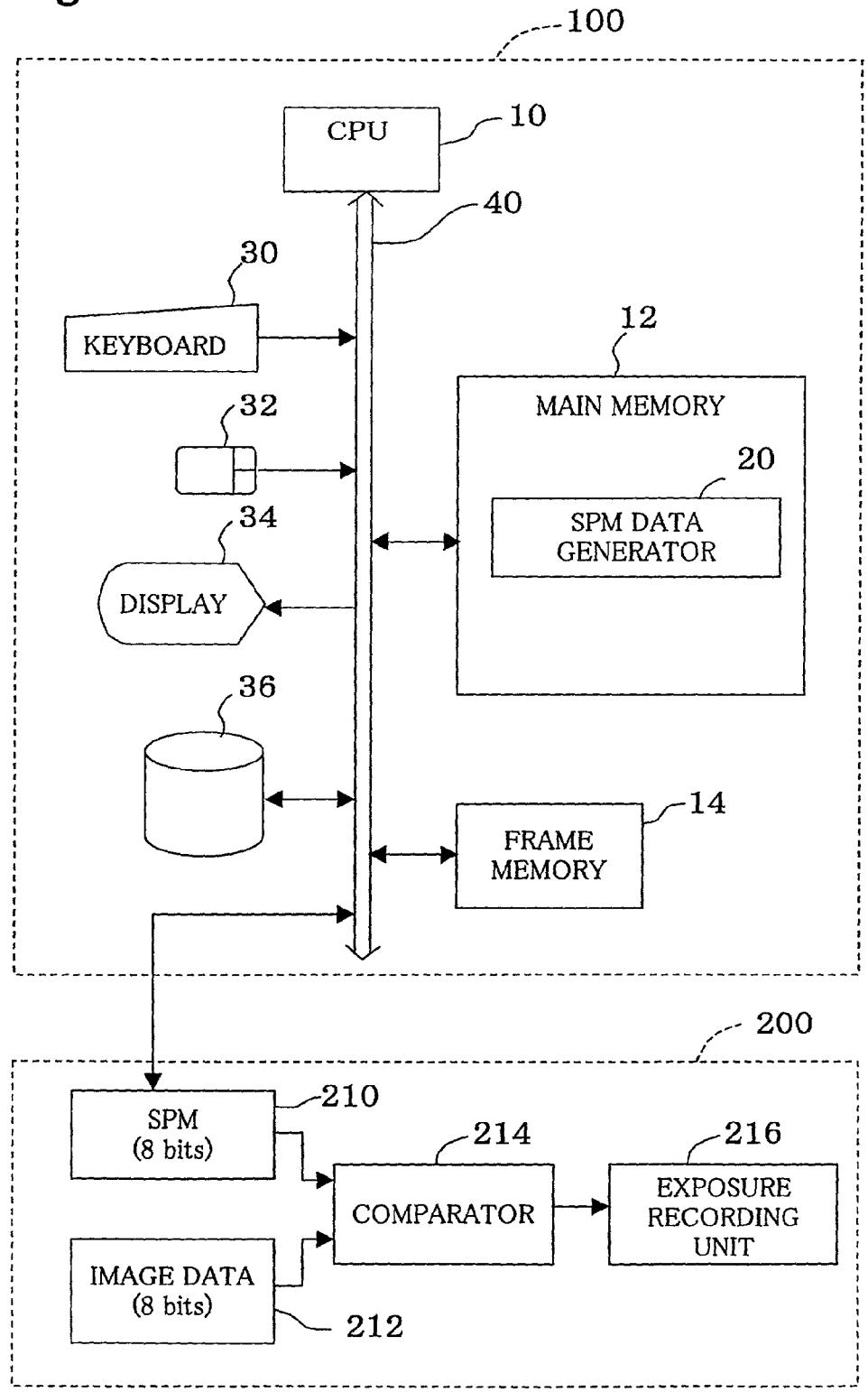
FIG. 1 is a block diagram showing the configuration of an image processing system embodying the present invention.

A. Apparatus Configuration:

FIG. 1 is a block diagram showing the configuration of an image processing system embodying the present invention. This image processing system comprises a computer 100 and an image recorder 200.

The computer 100 includes a CPU 10, a main memory 12 having a ROM and a RAM, a frame memory 14, a keyboard 30, a mouse 32, a display device 34, a hard disk 36 and a bus 40 that connect these elements. Various interface circuits are omitted from the drawing in FIG. 1.

The main memory 12 stores a computer program to realize the functions of an SPM data generator 20. The functions of the SPM data generator 20 will be described later. The computer program that implements the functions of the SPM data generator 20 is stored on a computer-readable recording medium, such as a floppy disk or a CD-ROM.

The image recorder 200 includes a screen pattern memory (SPM) 210, an image data memory 212, a comparator 214, and an exposure recording unit (halftone dot forming unit) 216. The SPM 210 stores SPM data (also called a 'threshold matrix') created by the SPM data generator 20. The comparator 214 compares the threshold value read from the SPM data and the multi-tone image data to generate halftone dot recording signals (exposure signals) in accordance with the result of this comparison. The exposure recording unit 216 forms halftone dots on a halftone dot recording medium, such as a photosensitive material, responsive to the halftone dot recording signals. The image recorder 200 may be realized by a recording device of a different type using a recording means other than exposure, such as ink expulsion.

Figure 2:
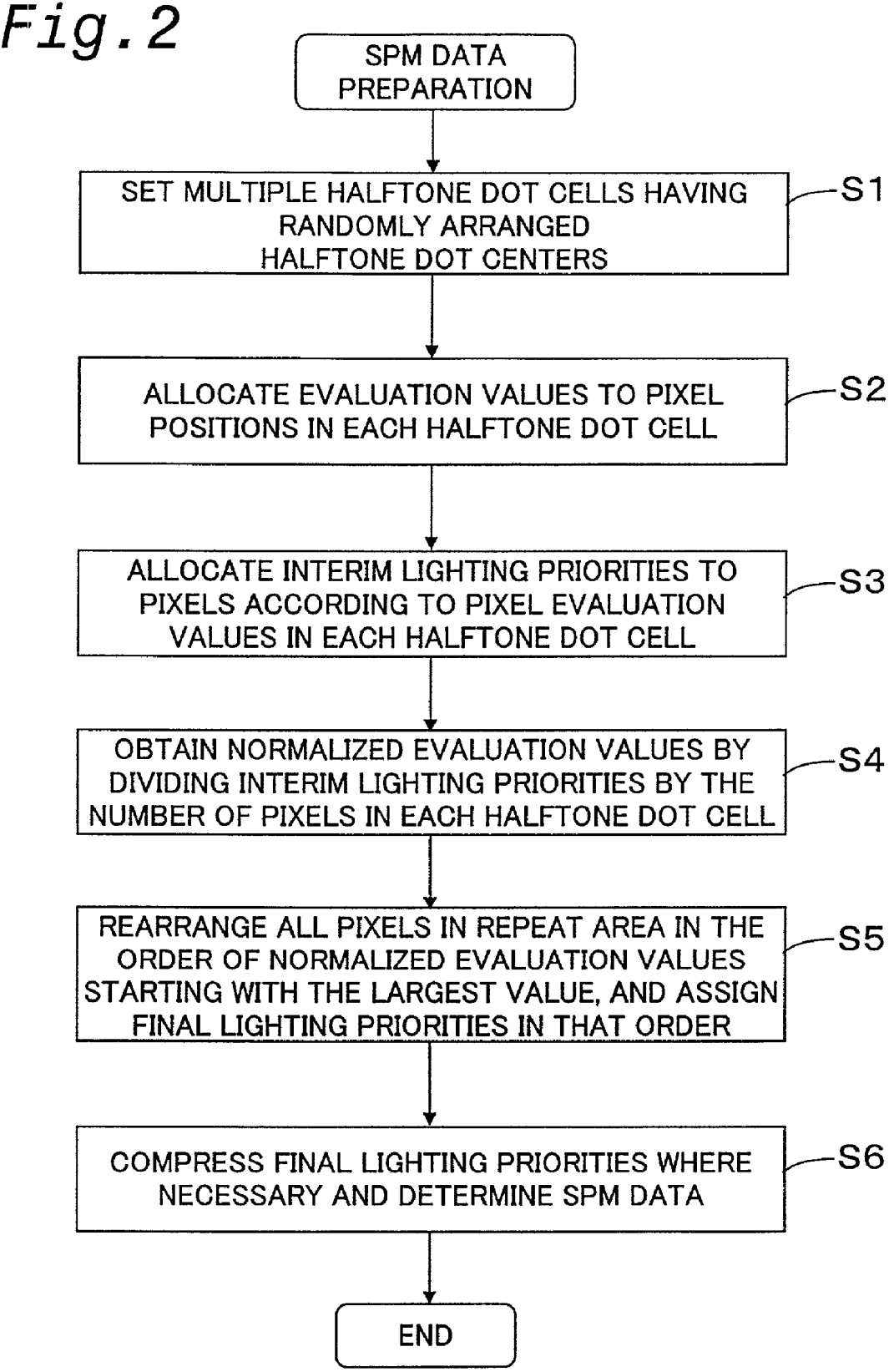
FIG. 2 is a flow chart showing the process of preparing SPM data.

B. First Embodiment:

FIG. 2 is a flow chart showing the process of preparing SPM data for halftone dots in a first embodiment. In step S1, a plurality of halftone dot areas (hereinafter referred to as 'halftone dot cells') that have randomly placed halftone dot centers are set. The random arrangement of the halftone dot centers can be attained by a method of solving a facility placement problem using a Voronoi diagram.

Figure 3:
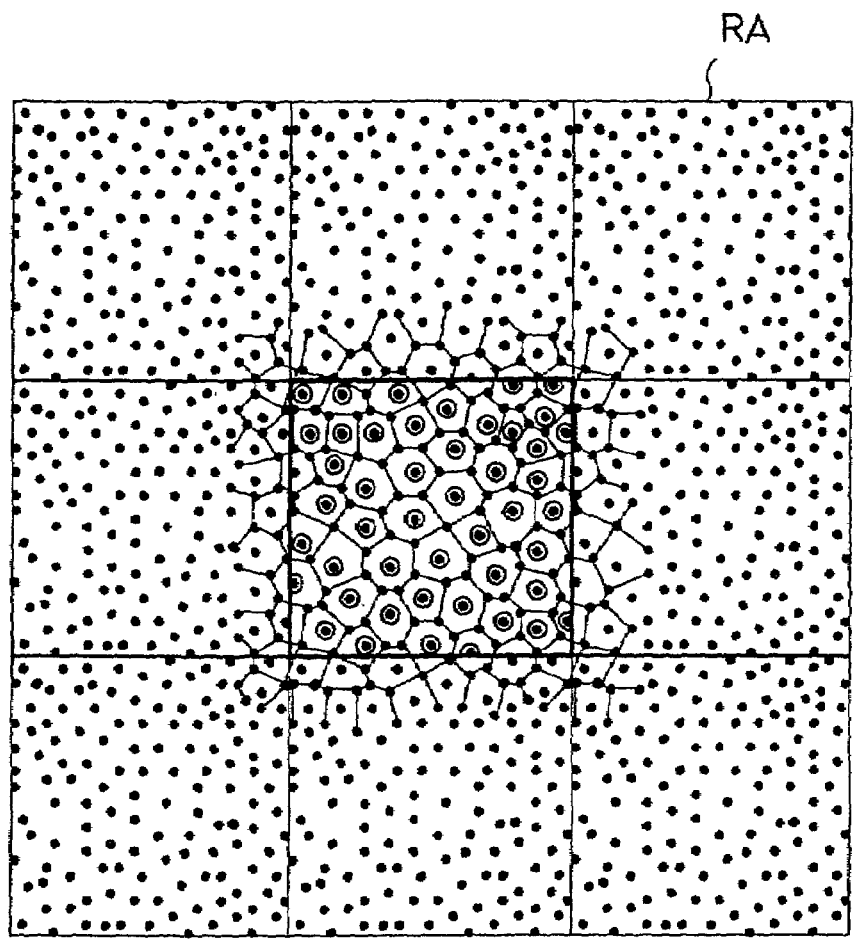
FIG. 3 shows randomly placed halftone dot centers.

FIG. 3 shows halftone dot centers that are randomly placed. In this example, nine repeat areas RA are arranged in a tiled fashion. A halftone dot center is located at the position of a black dot surrounded by a circle. The nine repeat areas RA in the figure are all identical. A plurality of halftone dot centers and polygons that surround each halftone dot center are drawn in the repeat area RA located in the center in FIG. 3. These polygons are called 'Voronoi polygons'. A Voronoi polygon is formed by seeking the perpendicular bisectors of the lines that connect a given halftone dot center with its adjacent halftone dot centers, and by connecting the intersections of these perpendicular bisectors. The vertices and edges of a Voronoi polygon are called Voronoi points and Voronoi edges, respectively, and the location of a halftone dot center is called a mother point. A drawing that shows Voronoi polygons for a large number of mother points is called a Voronoi diagram.

A Voronoi diagram is known as one of the methods for solving a geographical optimization problem called a facility placement problem. A facility placement problem is a non-linear optimization problem in which, when a plurality of facilities are placed in a two-dimensional space, the placement of the facilities is determined so as to minimize the aggregate total cost of use of the facilities by many users existing in the two-dimensional space. Here, the evaluation function of the 'cost' is the distance traveled by the users to each facility, for example. A Voronoi diagram may be used in order to locate post offices and public telephones for easy access. Voronoi diagrams are explained in detail in 'Arithmetic Geometry and Geographical Information Processing', "bit" magazine supplement (September 1986), Masao Iri, editor, published Sep. 10, 1986 (Kyodate Shuppan), pp. 163–168.

Figure 5C:
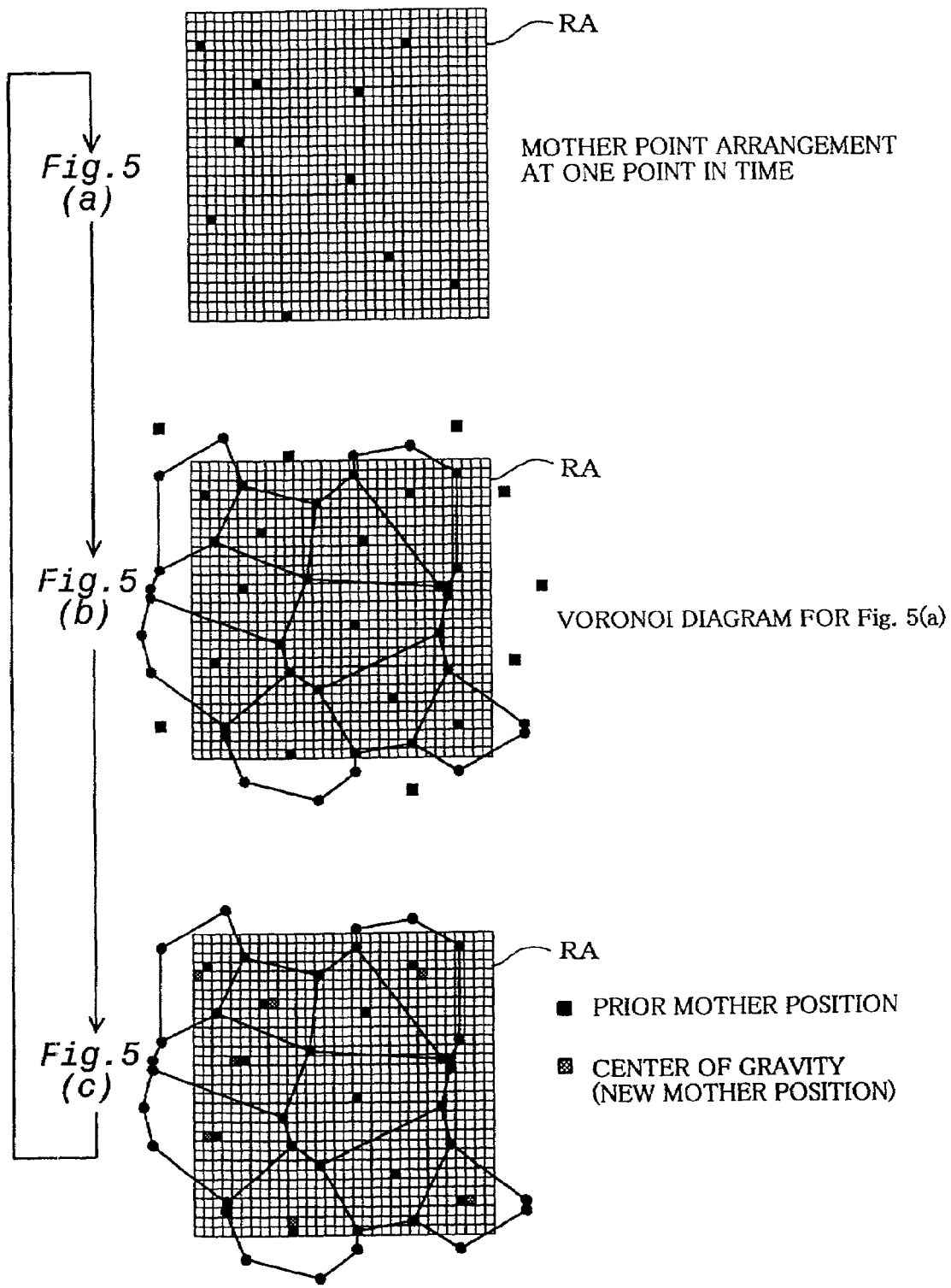
FIG. 5($a$)-5($c$) show the method of determining positions of randomly placed halftone dot centers with the aid of a Voronoi diagram.

FIG. 4 is a flow chart showing the detailed process of step S1. In step S11, a number of mother points equal to the number of halftone dot centers are randomly placed in the repeat area RA. FIGS. 5(a) through 5(c) show the procedure of the method of solving a facility placement problem using a Voronoi diagram. FIG. 5(a) shows a situation in which mother points are randomly placed in the repeat area RA. However, the number of mother points is small in FIG. 5(a) for simplification purposes. FIG. 5(b) shows a Voronoi diagram that corresponds to FIG. 5(a). This Voronoi diagram is formed by seeking the perpendicular bisectors of the lines that connect any given mother point and its adjacent mother points, and by connecting the intersections of these perpendicular bisectors. Because it is assumed that repeat areas RA are contiguously placed in a tiled fashion in a Voronoi diagram, mother points are drawn outside the repeat area RA in FIG. 5(b) as well.

In step S12, the center of gravity of each Voronoi polygon is calculated, and each mother point is moved to the corresponding center of gravity. The result of this step is shown in FIG. 5(c). The black squares in FIG. 5(c) indicate mother points before they are shifted, and the shaded squares indicate the centers of gravity (the locations of mother points after they are shifted). The three mother points located essentially in the center of the repeat area RA do not move.

In step S13, it is determined whether or not the amount of shift for the plurality of mother points is less than a prescribed threshold value, and if it is not less than the threshold value, step S12 is executed once more. For example, the total amount of shift of the a plurality of mother points in the repeat area RA is calculated, and if this total value exceeds five pixels, the process returns to step S12 and the mother points are shifted once more. On the other hand, where the amount of shift of the mother points is less than the threshold value, the processing from steps S12 through S13 is ended.

The processing in steps S12 and S13 results in a Voronoi diagram as shown in FIG. 3. The mother points in the Voronoi diagram finally obtained are used as the halftone dot centers. The Voronoi polygons each having a mother point are used as halftone dot cells while each mother point is used as the halftone dot center.

Any method other than this method using a Voronoi diagram may be applied to the method of randomly placing the halftone dots. Nevertheless, it is preferred that each halftone dot cell has an irregular configuration, as in the case of the method using a Voronoi diagram.

Figure 6B:
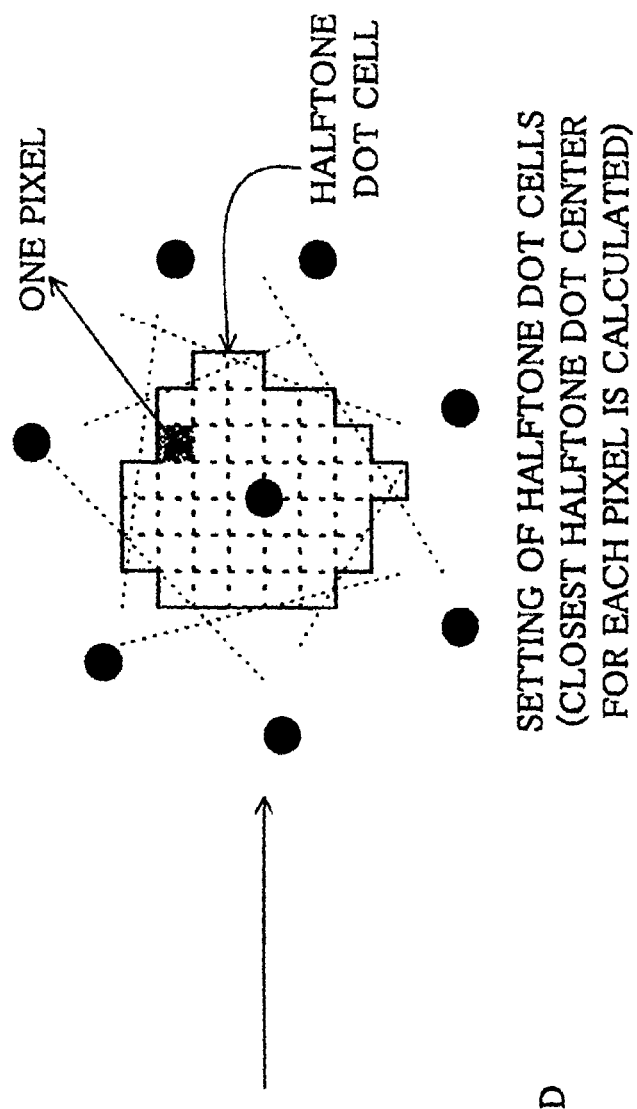
FIGS. 6($a$) and 6($b$) show the method of setting halftone dot cells when the positions of the halftone dot centers are determined using a method other than a Voronoi diagram.
Figure 6A:
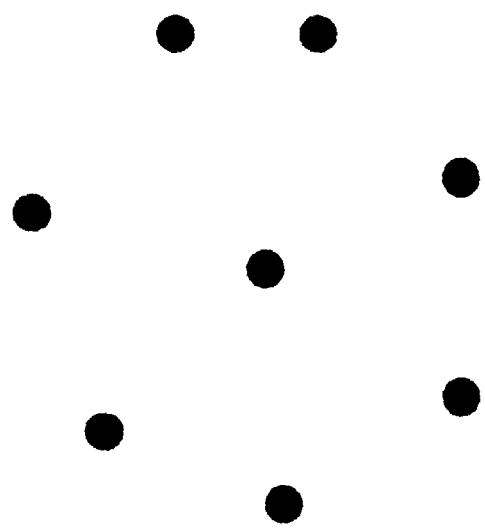

FIGS. 6(a) and 6(b) show the method of setting halftone dot cells when the locations of halftone dot centers are determined using a method other than a Voronoi diagram. Here, the halftone dot cells are set by assuming that each pixel is included in the halftone dot cell of the closest halftone dot center.

In step S2 in FIG. 2, evaluation values for the preparation of SPM data are allocated to the pixel locations in each halftone dot cell in the repeat area. FIGS. 7(a)–7(c) show the process of setting evaluation value distribution in a halftone dot cell. First, as shown in FIG. 7(a), a halftone dot cell HC of a polygon shape is divided into a plurality of triangular areas. In this example, an inner polygon IP indicated by solid lines is formed by sequentially connecting the middle points of each edge of the halftone dot cell HC indicated by dashed lines. The inner polygon IP is generally a polygon having N vertices (N being an integer larger than 2), and N=7 in the example of FIG. 7.

N pieces of outer triangular areas OTA are formed between the edges of the inner polygon IP and the edges of the halftone dot cell HC. In addition, by connecting each vertex of the inner polygon IP and the halftone dot center DC, the inner polygon IP is divided into N pieces of inner triangular areas ITA that have the halftone dot center DC as a common vertex. As a result, the halftone dot cell HC is divided into N pieces of inner triangular areas ITA and N pieces of outer triangular areas OTA. The benefit of dividing the halftone dot cell HC in this fashion will be explained later.

An evaluation value is then determined for each pixel in the halftone dot cell HC in accordance with a prescribed evaluation method. In the first embodiment, as shown in FIG. 7(b), the evaluation value is set to be 1.0 at the halftone dot center DC, −1.0 at the vertices of the edges of the halftone dot cell HC (indicated by open circles), and (0+α) at each vertex of the inner polygon IP (indicated by open triangles) other than the dot center DC. Here, α is a very small positive or negative random number which is separately determined at each vertex. A value of approximately 0.1 is preferred for the absolute value of the random number α. The random number α is used so that the timing at which adjacent halftone dots start to join together is made slightly different for each vertex. This point will be explained later in detail.

In FIG. 7(b), it is assumed that the plane on which halftone dots are formed is defined by x and y axes, and that the evaluation value at each pixel position is plotted along the z axis; then, a three-dimensional space defined by the x, y and z axes is defined. This three-dimensional space will be hereinafter referred to as an 'evaluation value space', and the solid constructed by the evaluation value distribution for the pixels will be referred to as an evaluation value solid. In this evaluation value space, the evaluation values for the pixels in the same triangular area can be assumed to essentially form a flat plane. Therefore, the evaluation value solid can be seen as the polygonal pyramid whose bottom plane is the inner polygon IP and whose peak is defined by the evaluation value at the halftone dot center DC. The side planes of the pyramid are defined by the evaluation values of respective pixels in the inner polygon IP.

The evaluation value for each pixel in the halftone dot cell HC is determined as shown in FIG. 7(c), for example. FIG. 7(c) shows one triangular plane ABC of the evaluation value solid shown in FIG. 7(b). The coordinates of the three vertices A, B and C of this triangular surface are known. The evaluation value dz at any point D on the triangular surface can be determined in the following manner.

First, a cross product of the vectors AB and AC is calculated to obtain a vector ABC that intersects the triangular surface ABC at a right angle. Because the vector AB and the vector AC are both known, the components of the vector ABC can be computed from these known values. At the same time, because the vector AD that extends from the point A to any pixel D resides on the triangular surface ABC, it should run perpendicular to the vector ABC. Therefore, an inner product of the vector ABC and the vector AD becomes 0.

Specifically, the components of the vector AD are (dx−ax, dy−ay, dz −az), and if the components of the vector ABC are (Vx, Vy, Vz), the inner product of the vector ABC and the vector AD is provided by the following equation.

$$ABC \cdot AD = Vx(dx-ax) + Vy(dy-ay) + Vz(dz-az) = 0$$

In the above equation, the values other than the evaluation value dz at pixel D are known. Therefore, the evaluation value dz at any pixel D is determined by solving the above equation.

Evaluation values are thus determined for all pixels in all halftone dot cells in the repeat area. These evaluation values are within the range of about −1.0 to 1.0.

In step S3 in FIG. 2, interim lighting priorities ranging from 0 to (M−1), where M is the number of pixels in the halftone dot cell, are assigned to the pixels in each halftone dot cell in the order of the evaluation values. The number of pixels M contained in each halftone dot cell differs for each halftone dot cell, and therefore the range of the interim lighting priorities 0 through (M−1) also varies for each halftone dot cell.

In step S4, the evaluation value for each pixel is normalized by dividing the interim lighting priority by the number of pixels M (or M−1) for each halftone dot cell. As can be seen from the above explanation, the normalized evaluation value is a value ranging from 0 to 1.

Figure 8A:
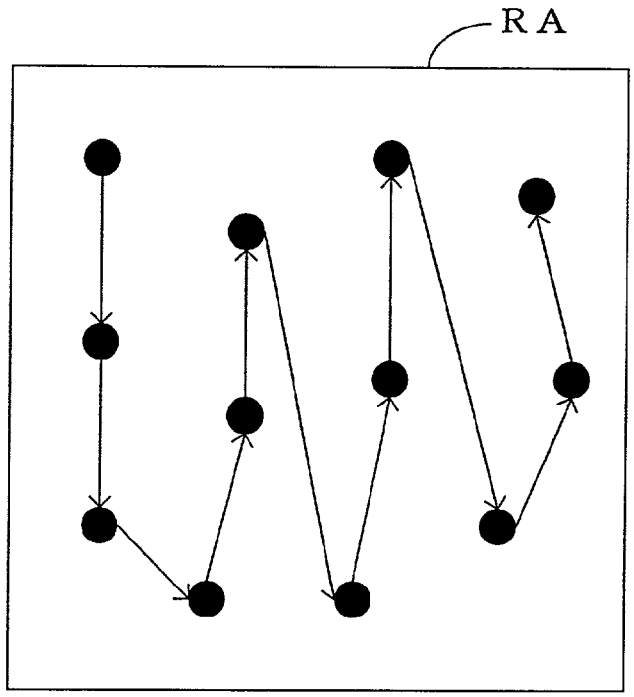
FIGS. 8(A) and 8(B) show an example of the setting of the final lighting priority sequence.
Figure 8B:
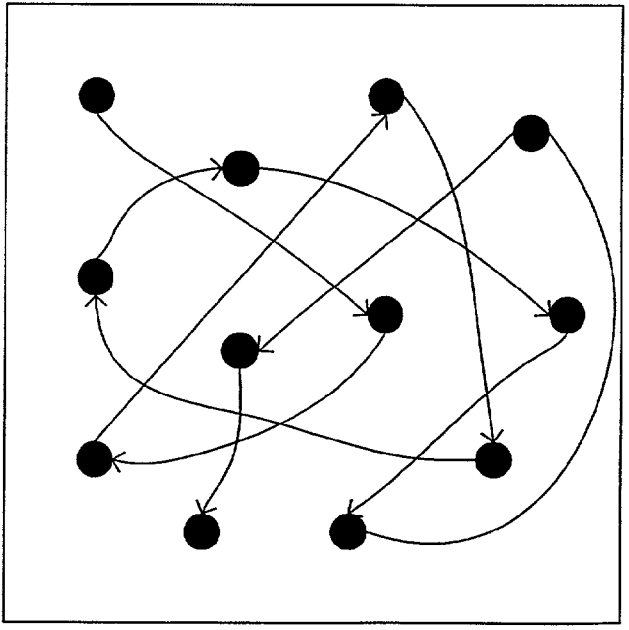

In step S5, all pixels in the repeat area are rearranged in the order of their normalized evaluation values starting with the largest value, and final lighting priorities are allocated to the pixels according to that order. As can be seen from FIG. 3, many halftone dot cells exist in the repeat area RA. The repeat area RA therefore may include a plurality of pixels having an identical normalized evaluation value. FIGS. 8(A) and 8(B) show comparison of a desirable final lighting priority sequence and an undesirable final lighting priority sequence when there are many pixels having the same normalized evaluation value in the repeat area RA. FIG. 8(A) shows the undesirable example, in which the final lighting priority sequence is set simply in accordance with the order of pixel arrangement. FIG. 8(B) shows the desirable example, in which the final lighting priority sequence is set such that no correlation occurs between the final lighting priority sequence and the order of pixel arrangement. In the undesirable example, lit pixels (blackened pixels) concentrate in a local area (the left side of the repeat area, for example) at a particular image density, and therefore, unevenness may occur in the image. On the other hand, if the final lighting priority sequence is set such that no correlation occurs between the final lighting priority sequence and the order of pixel arrangement, as in the case of the desirable example, the lit pixels are appropriately dispersed, and therefore the spatial frequency of the image increases and unevenness of the image is reduced.

Where Mt pieces of pixels exist in the repeat area RA, values from 0 to (Mt−1) are allocated to the pixels in the area RA as the final lighting priorities.

In step S6, SPM data is generated by performing tone compression on the final lighting priorities, if necessary, in accordance with the number of tone levels of the multi-tone image data. For example, where the values of the multi-tone image data may fall within the range 0 through Nd, tone compression is performed in which the final lighting priority of each pixel is multiplied by (Nd−1)/(Mt−1). Here, Mt is the number of pixels in the repeat area RA. As a result, SPM data (a threshold matrix) having threshold values in the range of 0 through (Nd−1) is prepared.

The recording status of each pixel, that is, recording or no recording, is determined in the following manner by comparing the threshold value TD of the SPM data and the multi-tone image data ID.

Where TD<ID: recording

Where ID≦TD: no recording

Because the range of the multi-tone image data ID is 0 through Nd and the range of the threshold value TD is 0 through (Nd−1), the multi-tone image is reproduced with (Nd+1) tones through the above comparison.

Figure 9C:
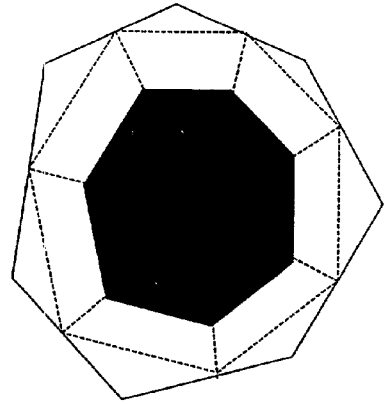
FIGS. 9($a$)–9($f$) show an example of the process of halftone dot growth in the first embodiment.
Figure 9B:
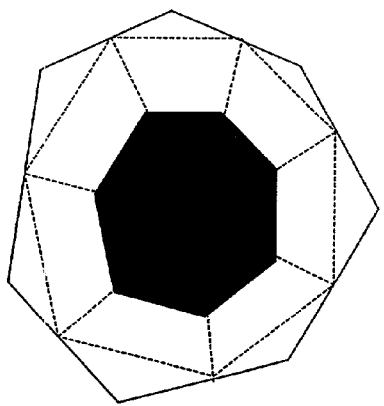
Figure 9A:
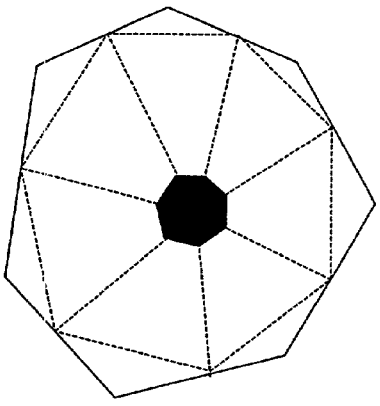
Figure 9F:
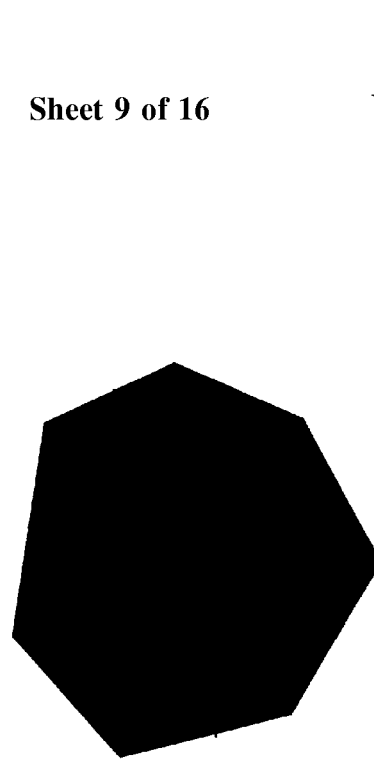
Figure 9E:
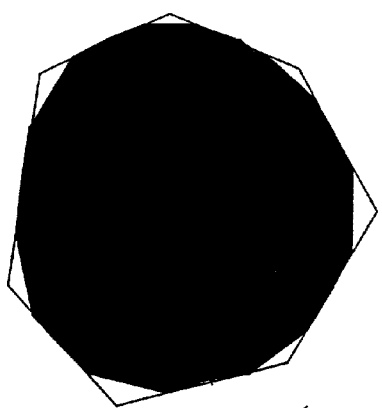
Figure 9D:
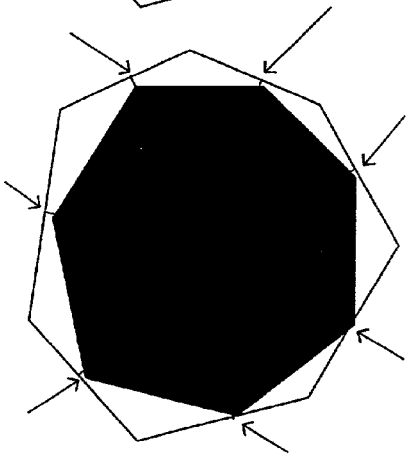

FIGS. 9(a)–9(f) show one example of the process of growth of a halftone dot formed using SPM data thus obtained. One feature of the halftone dots of the first embodiment is that the a plurality of joining points, which are the points at which a halftone dot joins with its adjacent halftone dots, do not start to join with the adjacent halftone dots at the same time at a particular halftone dot area rate, as shown in FIG. 9(d). In other words, each halftone dot has a plurality of joining points, and at least one joining point starts to join with an adjacent halftone dot at a halftone dot area rate that is different from those for the other joining points. Here, the 'joining' of two halftone dots means that the recorded pixels of these two halftone dots at the joining point are located vertically or horizontally adjacent to each other.

In the example shown in FIG. 9(d), seven joining points exist at the locations indicated by arrows on the circumference of the halftone dot. These joining points do not start to join with all of the adjacent halftone dots at the same time at a certain halftone dot area rate, but instead, they sequentially start to join with the adjacent halftone dots as the halftone dot grows. This feature is obtained by the setting of the evaluation values at the vertices (open triangles) of the inner polygon IP using a random number α, as explained with reference to FIG. 7(b).

In the situation shown in FIG. 9(e), a plurality of white triangular areas are formed in a sporadic fashion around the black halftone dot. These triangular areas correspond to the outer triangular areas OTA shown in FIG. 7(a). As can be seen from the above explanation, the features of the configuration and growth process of a halftone dot are determined via the setting of the evaluation value distribution shown in FIGS. 7(a)–7(c).

Figure 10:
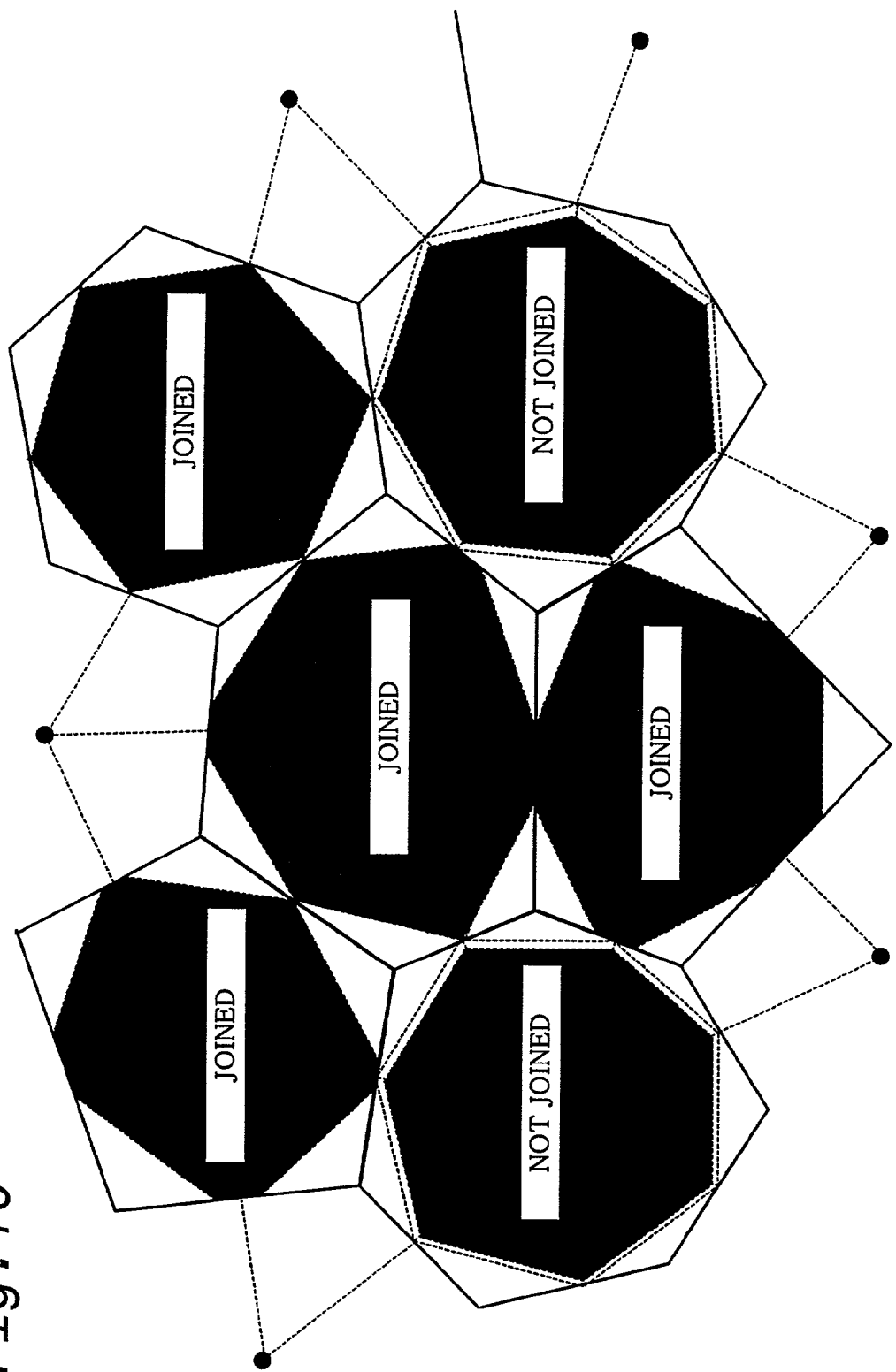
FIG. 10 shows an example of multiple halftone dots formed in an image area having a uniform halftone dot area rate in the first embodiment.
Figure 12A:
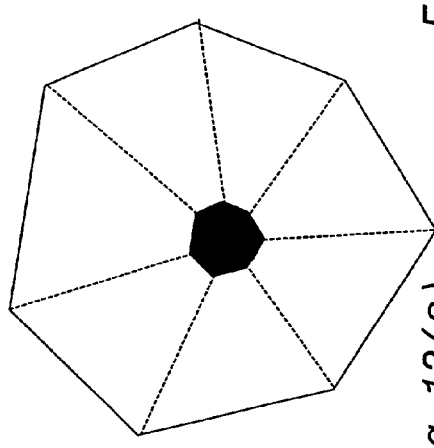
FIGS. 12($a$)–12($f$) show an example of the process of halftone dot growth in the second embodiment.
Figure 12B:
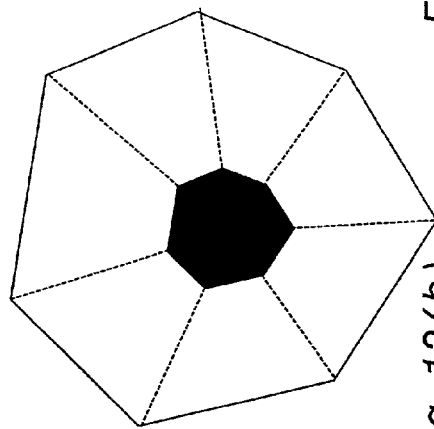
Figure 12C:
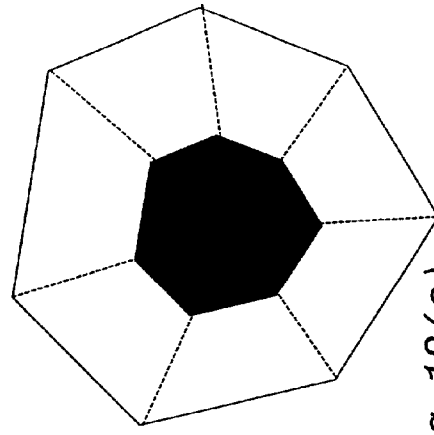
Figure 12D:
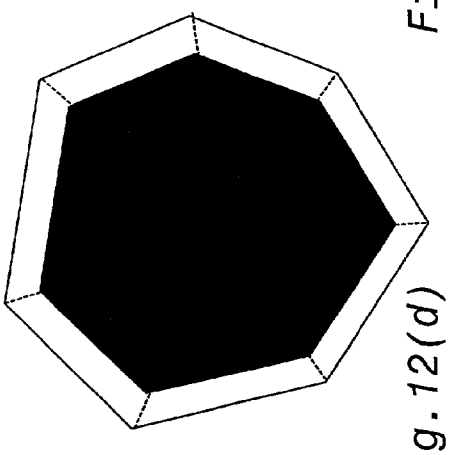
Figure 12E:
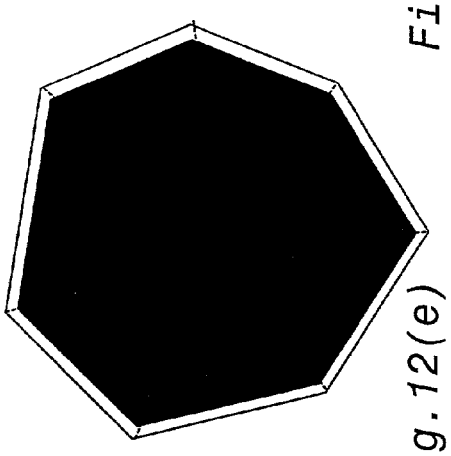
Figure 12F:
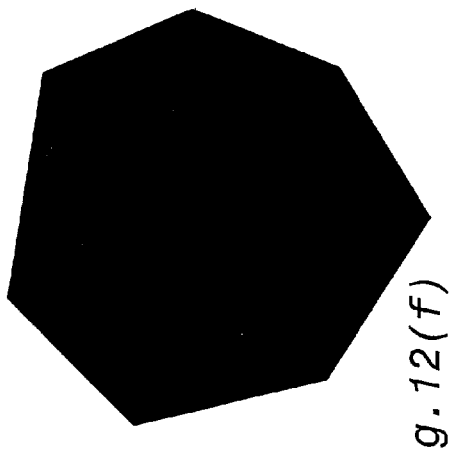

FIG. 10 shows an example of a plurality of halftone dots formed in an image area with a uniform halftone dot area rate (i.e., a tint image). Among the six halftone dots shown in this drawing, four halftone dots are in contact with the adjacent halftone dot cells, while the remaining two halftone dots are not in contact with their adjacent halftone dot cells at some or any of their joining points.

C: Second Embodiment

The halftone dot configuration can be changed in various ways by changing the evaluation value distribution (FIG. 7) that characterizes the halftone dot configuration. FIGS. 11(a) and 11(b) show the setting of the evaluation value distribution in a second embodiment. The halftone dot cell HC is divided into a plurality of triangular areas by connecting the halftone dot center DC and the vertices of the polygon of the halftone dot cell HC with straight lines. As shown in FIG. 11(b), the evaluation value at the halftone dot center DC is then to 1.0, and the evaluation value at each vertex of the halftone dot cell HC is set to (−1.0+α) where α is a positive or negative random number. The calculation method for the evaluation value at each pixel is the same as that explained with reference to FIG. 7(c).

FIGS. 12(a)–12(f) show the process of the growth of a halftone dot in the second embodiment. In the situation shown in FIG. 12(e), white pixel areas are formed along the periphery of the halftone cell. This is because the outer triangular areas OTA (FIG. 7(a)) in the first embodiment are not formed in the second embodiment. However, because the evaluation value at each vertex of the halftone dot cell is set based on the random number α in the second embodiment as well, the second embodiment also has the feature that the joining points do not start to join with the adjacent halftone dots at the same time at any particular halftone dot area rate.

FIG. 13 shows one example of a tint image recorded with the halftone dots pertaining to the second embodiment. The configurations of the halftone dots shown in FIG. 13 are close to those actually used in printing process. The halftone dots gradually grow as the halftone dot area rate increases from 5% to 63%. While the actual growth process shown in FIG. 13 appears to differ substantially from the idealized example shown in FIGS. 12(a)–12(f), both examples use the same basic process.

When the halftone dot area rate is 5%, each halftone dot consists of one or two pixels. Some halftone dot cells do not yet have a formed halftone dot. Halftone dots appear in all halftone dot cells when the halftone dot area rate is 17% in the example of FIG. 13.

The halftone dots begin to join with each other when the halftone dot area rate is 38%. However, at this rate, joining occurs at the one location indicated by a circle. When the halftone dot area rate reaches 45%, the halftone dots are in contact with each other in the two locations indicated by circles. When the halftone dot area rate reaches 53%, the number of halftone dots joined with adjacent halftone dots increases slightly. When the halftone dot area rate is 63%, most of the halftone dots are joined with the adjacent halftone dots. However, some halftone dots are still not in contact with adjacent halftone dots. In actuality, half of the halftone dots become joined with the adjacent halftone dots when the halftone dot area rate is approximately 60%. This joining process of the halftone dots also applies to the halftone dots in the first embodiment.

Generally, in a tint image recorded with the halftone dots according to the present invention, half of the halftone dots are not in contact with the adjacent halftone dots when the halftone dot area rate is 50%, and half of the halftone dots become joined with the adjacent halftone dots at the halftone dot area rate more than 50%.

FIGS. 14(a) and 14(b) show examples of tint images reproduced using various conventional halftone dots. FIG. 14(a) shows an image reproduced with AM halftone dots (square dots), and FIG. 14(b) shows an example in image reproduced with FM dots.

AM halftone dots start to join with the other halftone dots at the same time at a halftone dot area rate of about 50%. Consequently, tone jump easily occurs at this halftone dot area rate. FM dots do not grow with the increase of the image density, but instead the number of halftone dots increases. The small size of FM dots causes the problem of instability of dot reproduction in the printing process.

In contrast, the halftone dots according to the embodiments of the present invention have a first feature that more than half of the halftone dots do not join with the adjacent halftone dots at a halftone dot area rate less than 50%, and half of the halftone dots join with the adjacent halftone dots at a halftone dot area rate more than 50%. A second feature is that all halftone dots do not simultaneously start to join with each other at any particular halftone dot area rate, and a third feature is that the halftone dots are randomly placed. These features offer the following various advantages.

The first advantage is that the tone jump caused by the simultaneous joining of the halftone dots is reduced. The second advantage is that, as can be seen from FIG. 3 and FIG. 10, tint images, or images of a uniform density, are smoothly reproduced because there is little variation in the distances between the halftone dot cells and in the halftone dot cell size even though the halftone dot centers are randomly placed. The third advantage is that in comparison with the fine dots used in conventional FM screening (also termed FM dots), the (circumference/area) ratio of a halftone dot is small, and as a result, the halftone dot size is stable during printing process; this means that the so-called halftone dot gain is small. The fourth advantage is that in a halftone dot recorder that exposes a photosensitive material using light beams, so-called beat noise does not easily occur. Beat noise is a phenomenon in which linear noise part appears on the recorded halftone dot image along the main scanning direction due to errors in size and position of the light spots formed by a plurality of photo-emitters. AM halftone dots, which are arranged in a regular pattern, are prone to beat noise, but such beat noise is less likely to occur for the halftone dots of the above embodiments because they are randomly placed.

D. Modifications

D1. Modification 1

Figure 15A:
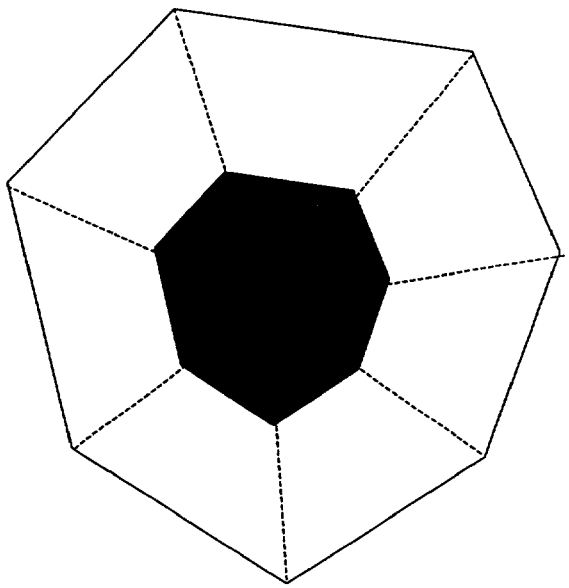
FIGS. 15($a$) and 15($b$) show a bi-tone halftone dot and a tri-tone halftone dot.
Figure 15B:
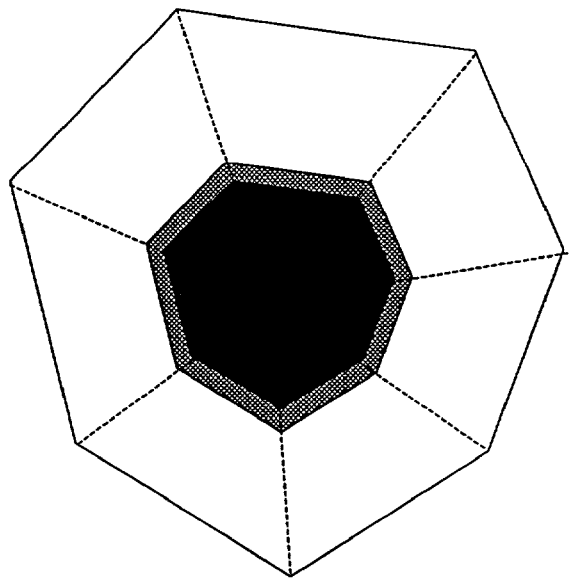

In the embodiments described above, the pixels are recorded based on two values of ON and OFF, but the present invention may also be applied when the pixels are recorded based on a plurality of values more than two. FIGS. 15(a) and 15(b) show a comparison of a bi-tone halftone dot and a tri-tone halftone dot. The bi-tone halftone dot consists of pixels recorded based on two value signals, and the tri-tone halftone dot consists of pixels recorded based on three value signals. In the tri-tone halftone dot, the white area includes pixels having a density value of 0, the black area includes pixels having a density value of 1, and the hatched area includes pixels having a density value of 0.5. Such multi-halftone dots can be formed based on essentially the same method as that used in the embodiments described above. For example, the density of each pixel may be determined by assigning n different threshold values to one pixel and comparing the image data and the n threshold values for each pixel. In order to attain this arrangement, n different evaluation values are set for each pixel in the above-described embodiments, for example.

D2. Modification 2

Figure 16A:
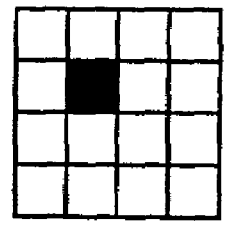
FIGS. 16($a$) and 16($b$) show a situation in which the smallest halftone dot is constituted by only one recorded pixel and another situation in which the smallest halftone is constituted by a plurality of recorded pixels.
Figure 16B:
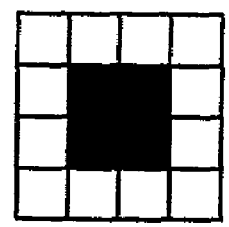

As can be seen from FIG. 13, in a highlight area (i.e., an area in which the halftone dot area rate is low), the number of pixels constituting one halftone dot is maintained small. If the size of one pixel used in the image recorder 200 is very small, the size of a halftone dot in the highlight area is also small, and the printing stability will decrease consequently. For example, if the smallest halftone dot is constituted by one pixel, as shown in FIG. 16(a), it may cause the printing instability problem. In order to avoid this problem, it is preferred that the smallest halftone dot is constituted by a plurality of pixels at all times, as shown in FIG. 16(b).

D3. Modification 3

The halftone dots according to the present invention may be applied to all color separations used in printing process (i.e., for all printing inks), or alternatively, may be applied to some color separations only. This applies not only when the four color inks of YMCK are used, but when five or more inks are used as well. For example, AM halftone dots having a 45° screen angle may be used for color separation for which it is desired that the horizontal and vertical line edges be clearly reproduced, and the halftone dots of the present invention may be used for the other color plates. The halftone dots according to the present invention are randomly positioned and configured, and therefore, they offer the advantage that moiré does not occur even when they are used in combination with AM halftone dots.

D4. Modification 4

When the halftone dots of the present invention are applied in a plurality of color separations, the number of halftone dots in a certain area (in one repeat area RA, for example) may be set to vary for each color seperation. The tone of the reproduced image generally depends on the number of halftone dots in a certain area. Since the number of halftone dots in a certain area can be set to any number in the present invention, the tone of the reproduced image is freely controlled using this feature.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Halftone dots used in printing, characterized in that:
   each halftone dot is randomly placed, and each halftone dot is formed within a halftone dot cell wherein the halftone dot cells have different irregular Voronoi convex polygons having plural sides;
   a halftone dot area rate at which half of the halftone dots join with their adjacent halftone dots in an image area having a uniform image density is set to a value larger than 50%;
   when each halftone dot joins with its adjacent halftone dots, a plurality of joining points at which the halftone dot joins with its adjacent halftone dots are located at central or end points of the sides of the Voronoi convex polygons, and the plurality of joining points do not simultaneously start to join with the adjacent halftone dots; and
   a smallest size halftone dot consists of plural pixels, and each halftone dot grows within the halftone dot cell as the image density increases.

2. A method for forming halftone dots used in printing, comprising the steps of:
   providing a threshold matrix including a plurality of threshold values;
   comparing a selected threshold value selected from the threshold matrix with multi-tone image data; and
   forming halftone dots in accordance with results of the comparison, wherein
   the threshold matrix is constructed such that:
   (1) each halftone dot is randomly placed, and each halftone dot is formed within a halftone dot cell wherein the halftone dot cells have different irregular Voronoi convex polygons having plural sides;
   (2) a halftone dot area rate at which half of the halftone dots join with their adjacent halftone dots in an image area having a uniform image density is set to a value larger than 50%;
   (3) when each halftone dot joins with its adjacent halftone dots, a plurality of joining points at which the halftone dot joins with its adjacent halftone dots are located at central or end points of the sides of the Voronoi convex polygons, and the plurality of joining points do not simultaneously start to join with the adjacent halftone dots; and a smallest size halftone dot consists of plural pixels, and each halftone dot grows within the halftone dot cell as the image density increases.

3. A halftone dot recorder comprising:

a threshold matrix memory configured to store a threshold matrix including a plurality of threshold value;

a comparator configured to compare a selected threshold value read out from the threshold matrix with multi-tone image data; and a halftone dot forming unit configured to form halftone dots in accordance with results of the comparison by the comparator, wherein the threshold matrix is constructed such that:

(1) each halftone dot is randomly placed, and each halftone dot is formed within a halftone dot cell wherein the halftone dot cells have different irregular Voronoi convex polygons having plural sides;

(2) a halftone dot area rate at which half of the halftone dots join with their adjacent halftone dots in an image area having a uniform image density is set to a value larger than 50%;

(3) when each halftone dot joins with its adjacent halftone dots, a plurality of joining points at which the halftone dot joins with its adjacent halftone dots are located at central or end points of the sides of the Voronoi convex polygons, and the plurality of joining points do not simultaneously start to join with the adjacent halftone dots; and a smallest size halftone dot consists of plural pixels, and each halftone dot grows within the halftone dot cell as the image density increases.

\* \* \* \* \*